United States Patent [19]
Fawley

[11] 4,165,659
[45] Aug. 28, 1979

[54] VALVE HAND WHEEL COVER

[76] Inventor: Norman C. Fawley, P.O. Box 6090, El Monte, Calif. 91734

[21] Appl. No.: 904,802

[22] Filed: May 11, 1978

[51] Int. Cl.² .............................................. B62D 1/06
[52] U.S. Cl. ...................................... 74/558; 74/558.5; 150/52 L; 150/52 R
[58] Field of Search ...................... 74/552, 558, 558.5; 150/52 R, 52 L, 52 M

[56] References Cited

U.S. PATENT DOCUMENTS

| | | | |
|---|---|---|---|
| 1,410,605 | 3/1922 | Schacht | 150/52 R |
| 1,564,957 | 12/1925 | Heyn | 74/558.5 |
| 2,985,552 | 5/1961 | Watanabe | 74/558.5 |
| 3,468,188 | 9/1969 | MacCoon | 74/558 |
| 3,768,503 | 10/1973 | Billington | 150/52 R |

FOREIGN PATENT DOCUMENTS

| | | | |
|---|---|---|---|
| 550773 | 9/1956 | Belgium | 150/52 R |
| 80373 | 9/1961 | France | 74/558.5 |
| 689548 | 4/1953 | United Kingdom | 74/558 |

*Primary Examiner*—Ro E. Hart
*Attorney, Agent, or Firm*—Lyon & Lyon

[57] ABSTRACT

A cover formed of plastic material dimensioned and shaped to fit over a circular valve hand wheel having a ring of alternate ribs and recesses, the cover having an opening approximating the diameter of the recesses and yieldable to stretch over the ring of ribs for retension thereby; the cover being translucent to expose information appearing on the hand wheel, such as to indicate the direction in which to turn the hand wheel in order to open or close the valve; the cover also having areas for embossing or otherwise applying further information.

4 Claims, 5 Drawing Figures

VALVE HAND WHEEL COVER

BACKGROUND

While not limited thereto, the present invention is particularly directed to on-off valves used to dispense the contents of compressed gas cylinders. Such valves are subjected to high pressure and must be completely leak proof. Usually substantial manual force must be applied to open or close the valve, such that at filling plants operators use gloves. Most valves for this purpose are die casts and possibly have sharp edges. This coupled with the need for high manual force can injur the user's hand. Also, during the use of the pressure cylinder, there is a substantial pressure drop across the valve, often resulting in cooling the hand wheel below the freezing point of water, thus rendering the valve dangerous to grasp, particularly if a strong grip is required. Many times wrenches or other leverage devices are used which can cause damage to the valve and is considered unsafe.

SUMMARY

The present invention is directed to a valve hand wheel cover which minimizes the problems concerning the handling of valves used on compressed gas cylinders, and is summarized in the following objects:

First, to provide a valve hand wheel cover which is molded into approximate confirmity with the dimensions and contour of the valve hand wheel, and is formed of plastic material having sufficient resiliency as to be stretched over the valve hand wheel and thereupon constrict into confirmity with the valve so that the cover may be forcibly gripped when opening or closing the valve.

Second, to provide a valve hand wheel cover, as indicated in the previous object, which has sufficient transparentcy so that information, such as closing or opening instructions on the valve handle, is readily visible; and further, provides areas for receiving additional information.

Third, to provide a valve hand wheel cover, as indicated in the preceding objects, in which the cover offers thermal protection of the user's hands in the event of excess cooling of the valve and also provides mechanical protection from rough edges of the valve.

DETAILED DESCRIPTION

Figure 1:
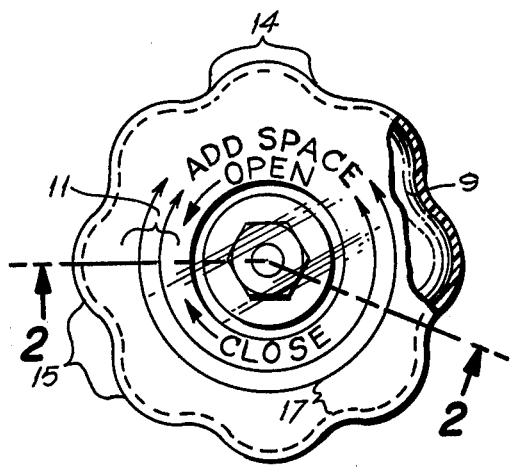
FIG. 1 is an end view of the valve hand wheel with a cover positioned thereon and shown partially in section.
Figures 2, 3, 4:
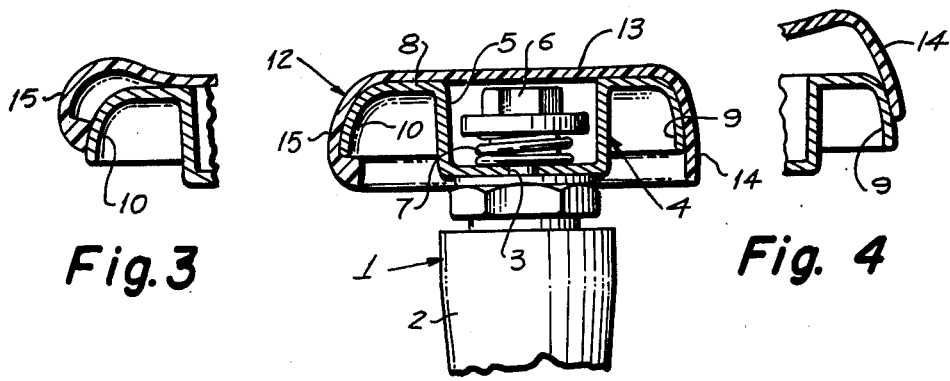
FIG. 2 is a sectional view taken through 2—2 of FIG. 1.
FIGS. 3 and 4 are fragmentary sectional views corresponding to FIG. 2 showing the cover as it appears when being fitted onto the valve hand wheel.
Figure 5:
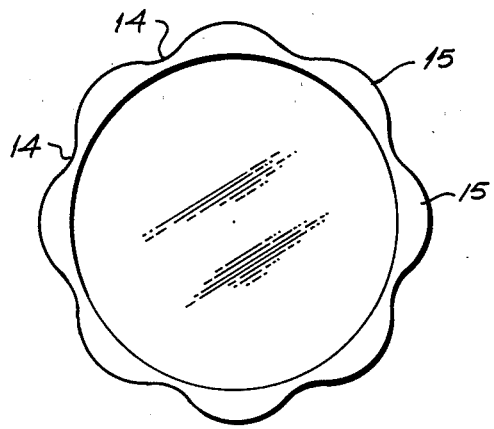
FIG. 5 is a bottom view of the cover as it appears when removed from the valve hand wheel.

It is intended that the cover be mounted on a conventional valve designated 1 which includes a body 2 and a stem 3. Secured to the stem 3 is a valve hand wheel 4 having a central recess 5 which receives a nut 6. Sometimes a spring 7 is interposed between the nut and the valve body which maintains a load on the valve. The valve hand wheel includes a top portion 8 surrounding the recess 5 and its radially outer portion merges into an axial curved flange portion which includes a ring of radial depressions 9 and radial projections 10 joined by transition portions. Surrounding the central recess 5 and contiguous thereto is an annular information space 11; that is, the space 11 has embossed thereon or otherwise formed thereon information useful in operating the valve, for example, the words "open" and "close", and appropriate arrows to indicate the direction in which to turn the valve in order to open or close the valve. The structure so far described is conventional.

A single piece cover member 12 is provided which is formed of plastic material having elastomeric properties. The cover member includes an essentially flat end portion 13 which overlies the end of the valve hand wheel 4 and merges with an axial flange portion overlying the flange portion of the valve hand wheel. In addition, the flange is provided with a ring of radial depressions 14 interposed between radial projections 15, the depressions and projections being joined by transition portions which conform to the depressions 9, projections 10 and transition portions therebetween.

The axial extremity of the flange portion defines an annular edge 16 corresponding in radius to the ring of depressions 14. The flat end portion 13 is provided with an inner information space overlying the recess 5 inwardly from the information space 11 and a radially outer information space surrounding the information space 11. In order to utilize the information space 11, the cover member 12 is formed of plastic material which is sufficiently transparent as to expose the information as shown in FIG. 1.

The cover is installed on the valve hand wheel by pressing the radial projections 15 over the radial projections 10 until the annular edge 16 passes axially beyond the projections 10. The cover being resilient stretches to pass over the projections 10 whereupon the annular edge 16 returns to its essentially circular configuration. While the cover member 12 may be installed readily, the cover member is secured against rotation relative to the handle 1. That is, the cover member is firmly restrained against peripheral movement relative to the valve hand wheel and in no manner interferes with the use of the valve hand wheel.

The cover member is of such thickness as to be used on valves which pass cryogenic material and thus tend to be cooled below water freezing temperature. If this occurs, transfer of heat from the user's hand to the hand wheel is reduced to the point that the valve may be manipulated without the need of gloves or other protection not maintained on the valve hand wheel.

Because of the protection afforded by the cover member, greater hand force may be applied which speeds up the filling operation while maintaining user's comfort.

Having fully described my invention, it is to be understood that I am not to be limited to the details herein set forth, but that my invention is of the full scope of the appended claims.

I claim:

1. A cover for a valve hand wheel including a top portion and an axially extending annular flange portion having a ring of radial projections spaced by a ring of radial depressions, for engagement by the fingers and thumb of the user, the cover comprising:
   a. a cover member having a top portion and a flange portion conforming respectively with the top portion and flange portion of the valve hand wheel to resist relative rotation;
b. the axially extended end of the cover flange portion defining a circle approximating the ring of radial depressions formed in the hand wheel;
c. the cover member being formed of plastic material having elastomeric properties whereby the cover member is capable of stretching over the ring of radial projections thereby to retain the cover member in position on the valve hand wheel.

2. A cover for valve hand wheels, as defined in claim 1, wherein:
a. the cover member is sufficiently transparent as to expose information carried by the valve hand wheel.

3. A cover for valve hand wheels, as defined in claim 2, wherein:

a. the cover member is provided with areas offset from the area of the valve handle containing information, and which are available for additional information.

4. A cover for the valve hand wheel of a compressed gas cylinder wherein the periphery of the hand wheel is corrugated forming a continuous series of merging radial projections and radial depressions to receive the thumb and fingers of a user, the cover comprising:
a. a cover member formed of plastic material having a normal contour in continuous mating relation to the projections and depressions to prevent rotation of the cover member relative to the hand wheel;
b. the cover member being yieldable to local displacement when free of the hand wheel to enable its projections to be urged over corresponding hand wheel projections until forced into conformity therewith.

* * * * *